(12) United States Patent
Johnson

(10) Patent No.: US 9,019,655 B1
(45) Date of Patent: Apr. 28, 2015

(54) HARD DISK DRIVE DISK CLAMP HAVING REDUCED RADIAL STIFFNESS

(71) Applicant: HGST Netherlands B.V., Amsterdam (NL)

(72) Inventor: Gale D. Johnson, Loveland, CO (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/315,231

(22) Filed: Jun. 25, 2014

(51) Int. Cl.
G11B 17/02 (2006.01)
G11B 17/028 (2006.01)

(52) U.S. Cl.
CPC ................ *G11B 17/0284* (2013.01)

(58) Field of Classification Search
CPC ....... G11B 17/02; G11B 17/022; G11B 17/08; G11B 17/028; G11B 17/0284
USPC ........... 360/98.08, 99.12, 99.05, 99.06, 98.05
See application file for complete search history.

(56) References Cited

U.S. PATENT DOCUMENTS

| | | | |
|---|---|---|---|
| 4,829,510 A | 5/1989 | Takahashi | |
| 5,490,024 A | 2/1996 | Briggs et al. | |
| 5,517,376 A | 5/1996 | Green | |
| 5,940,244 A * | 8/1999 | Canlas et al. | 360/98.08 |
| 6,483,661 B1 | 11/2002 | Martin et al. | |
| 6,624,967 B1 * | 9/2003 | Suwito | 360/98.08 |
| 7,158,343 B2 | 1/2007 | Kim | |
| 7,239,476 B2 | 7/2007 | Chan et al. | |
| 7,307,813 B1 * | 12/2007 | Suwito | 360/98.08 |
| 7,802,270 B2 * | 9/2010 | Ogawa et al. | 720/706 |
| 8,488,270 B2 * | 7/2013 | Brause et al. | 360/99.12 |
| 8,495,669 B2 | 7/2013 | Aman et al. | |
| 2002/0071205 A1 * | 6/2002 | Koyanagi et al. | 360/98.08 |
| 2007/0169140 A1 * | 7/2007 | Ogawa et al. | 720/712 |
| 2008/0231990 A1 * | 9/2008 | Dohya | 360/99.12 |

OTHER PUBLICATIONS

Woochul Kim et al., Optimal disk clamp design to minimize stress variation of disks in a hard disk drive, Journal of Mechanical Science and Technology, 2009, pp. 2645-2651, Issue 23, KSME & Springer.

* cited by examiner

*Primary Examiner* — Allen T Cao
(74) *Attorney, Agent, or Firm* — John D. Henkhaus

(57) ABSTRACT

A hard disk drive disk clamp is described, in which flex is introduced into the clamp in the radial direction so that, for example, as the disk expands radially at a different rate than the clamp as the temperature increases, less distortion is affected to the disk because the clamp can flex radially. With less disk distortion there is less repeatable runout (RRO) and more precise track following. The disk clamp may have an I-shaped cross-section along the outer portion of the disk clamp, at the contact area with the disk, to provide the radial flex.

20 Claims, 4 Drawing Sheets

HARD DISK DRIVE DISK CLAMP HAVING REDUCED RADIAL STIFFNESS

FIELD OF EMBODIMENTS

Embodiments of the invention may relate generally to hard disk drives and more particularly to a disk clamp.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution. In turn, as recording tracks in HDDs become narrower and narrower and bits are recorded smaller and smaller, there is a need for more accurate and sustainable head positioning, sometimes referred to as "track following". One of the factors impairing precise track following is repeatable runout (RRO), which generally refers to the deviation of the head from the theoretical perfect circle of the track. Among other factors, RRO is affected by temperature changes within an HDD because the interlocked components such as the disk spindle, the disk clamp, and the disk itself typically have different thermal expansion attributes.

Modern HDDs include servo systems that read and interpret servo bursts on the disk tracks, which contain special data that the head reads and the servo system firmware interprets to determine to which track the head is closest and how far off track center the head is. While servo systems can compensate for RRO, the HDD performance is detrimentally impacted in doing so due, for example, to some degree of latency involved with any such compensation scheme. Thus, the manner in which RRO is handled within HDDs is an important factor in improving the performance of HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a hard disk drive disk clamp configured for contact with a recording disk, where the disk clamp comprises a structure having an I-shaped cross-section (an "I-shaped structure") along the outer portion of the disk clamp at the contact area with the disk, and a hard disk drive comprising such a disk clamp. Thus, a disk clamp design as described introduces flex into the clamp in the radial direction so that, for example, as the disk expands radially at a different rate than the clamp as temperature increases, less distortion is introduced to the disk because the clamp can flex radially.

According to embodiments, the disk clamp comprises a structure that is stiffer in the axial direction than in the radial direction. Further, the I-shaped structure may comprise a first flange portion in contact with the contact area of the disk, a vertical web portion positioned axially in relation to, or over, the contact area of the disk, and a second flange portion which extends radially from an inner portion of the disk clamp. According to an embodiment, the first flange portion has a rounded surface at the contact area with the disk, and therefore the load applied from the disk clamp to the disk is locally applied through the web portion.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a hard disk drive disk clamp structure are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments

Figure 1:
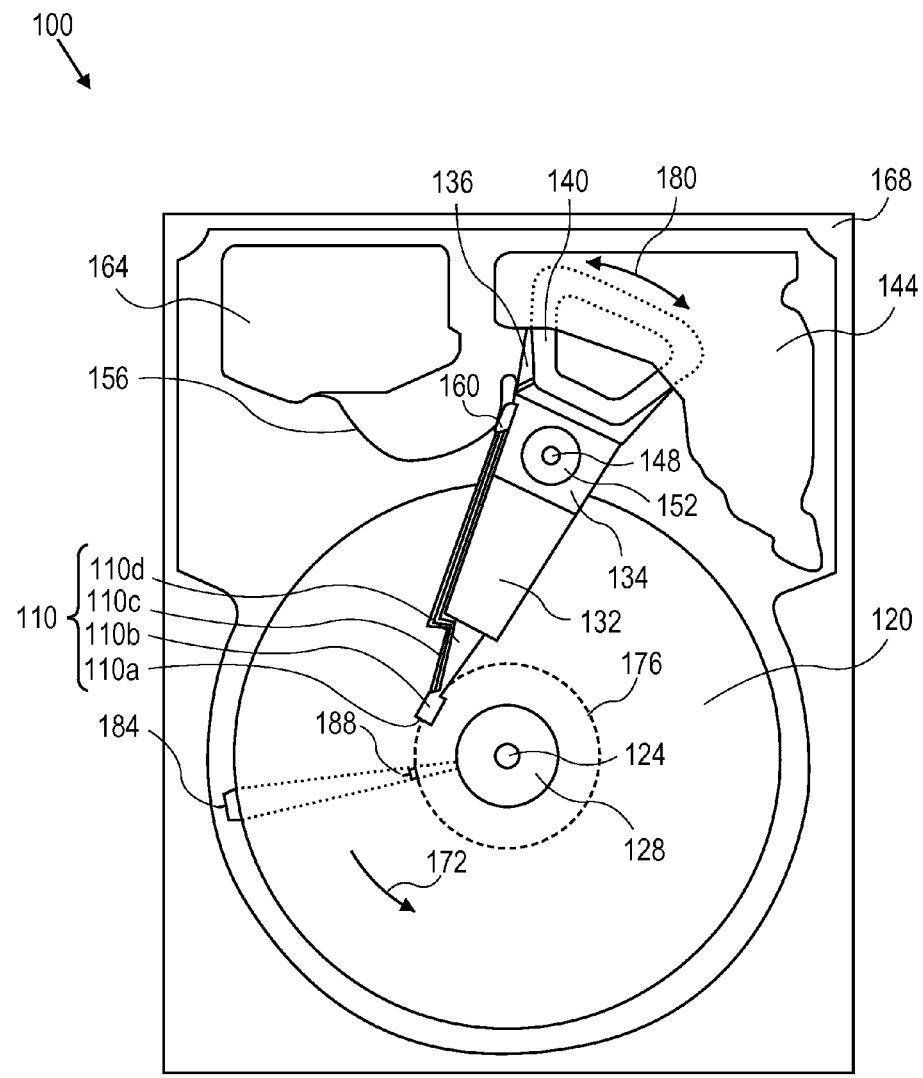
FIG. 1 is a plan view illustrating a hard disk drive (HDD), according to an embodiment of the invention.

Embodiments of the invention may be used in the context of a hard-disk drive (HDD) disk clamp. Thus, in accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

As mentioned, one of the factors impairing continuously precise track following is repeatable runout (RRO), and as track density increases in order to raise the surface recording density, the sensitivity to this problem also increases. One cause of RRO is disk distortion, which is often affected by temperature changes within an HDD. Disk distortion is generally caused by practically all clamp designs, which typically use multiple screws to load the clamp to the disk, which causes multiple high load regions which in turn create disk distortion.

While modern HDDs include servo systems that can compensate for RRO, the HDD performance is detrimentally impacted in doing so, such as by introducing some degree of latency into the HDD performance. Furthermore, an effective servo system should recalibrate whenever the disk distortion changes, and the distortion changes as the temperature within an HDD changes. Thus, if the temperature changes frequently, then the servo must accordingly recalibrate frequently, which reduces HDD performance. Another possibility is that the servo may not be able to recalibrate at any given time because it is busy with other tasks, which also reduces performance.

An Improved Disk Clamp for Reducing Disk Distortion

Figure 2:
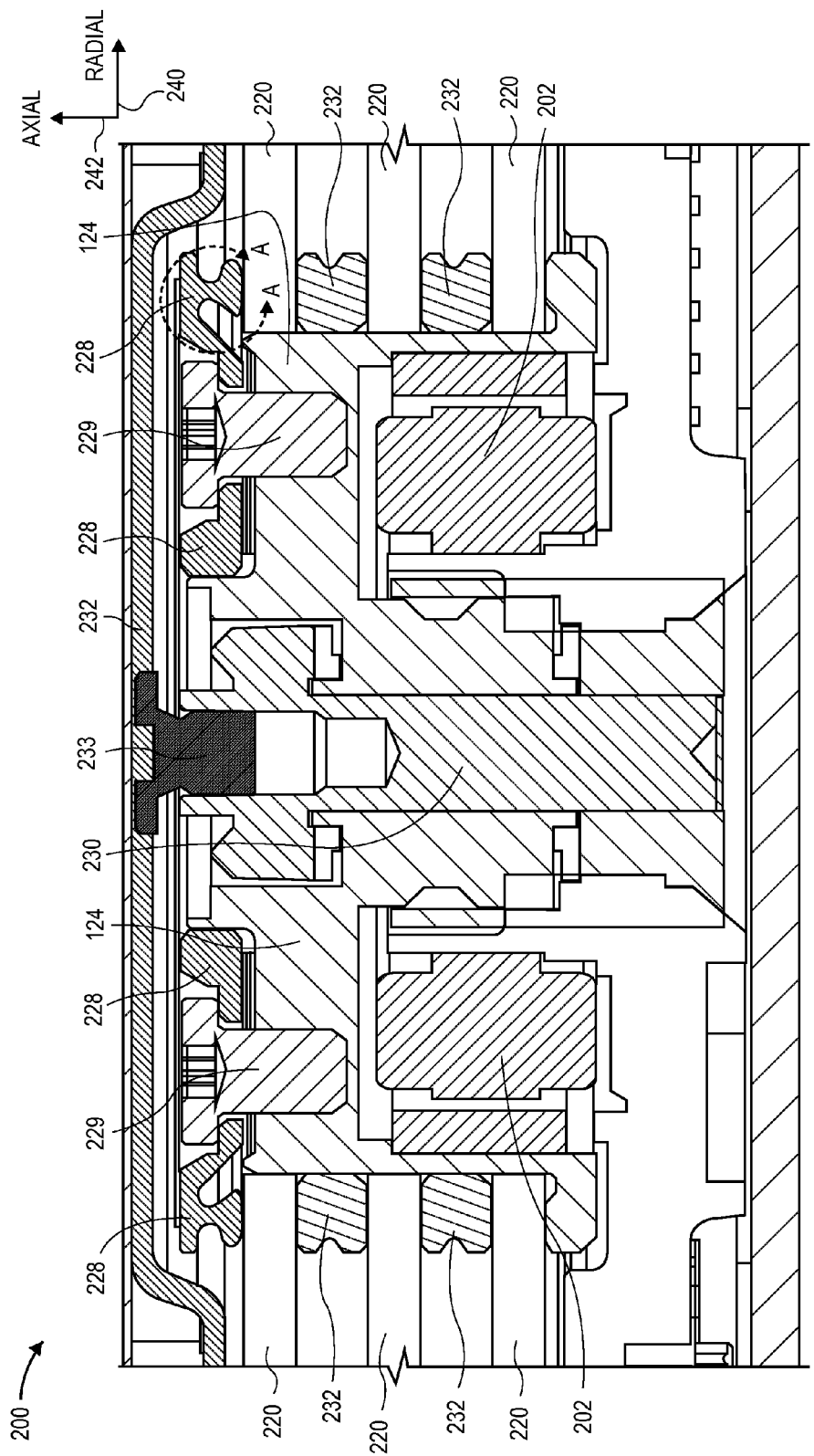
FIG. 2 is a cross-sectional view illustrating an HDD, according to an embodiment of the invention.

FIG. 2 is a partial cross-sectional view illustrating an HDD, according to an embodiment of the invention. As depicted in FIG. 2, HDD 200 is configured with a spindle (drive) motor 202 and a corresponding spindle 124, to which one or more recording disk 220 (see, e.g., media 120 of FIG. 1) is mechanically coupled by way of a disk clamp 228. Disk clamp 228 is typically attached to the spindle 124 using one or more attachment device 229, such as a screw or the like, and a spindle shaft 230 may be attached to an HDD cover 232 by an attachment device 233, such as a screw or the like, i.e., in a tied-shaft motor configuration. Alternatively, a rotating shaft motor design may be implemented in conjunction with the disk clamp 228.

Disk clamp 228 provides a clamping force or load to the disk 220, which affixes the disk 220 to the spindle 124. In HDDs configured with multiple disks 220, a spacer 232 is positioned between adjacent disks 220 to facilitate transfer of the clamping force from one disk to the next adjacent disk. An electrical signal provided to the spindle motor 202 enables the spindle motor 202 to spin, providing a torque to the spindle 124 which is in turn transmitted to the one or more disk 220 that is affixed to the spindle 124 by the disk clamp 228, thereby spinning the disk 220 as needed for data read and write operations.

An area of interest associated with disk clamp 228 is encircled by circle A-A, and is described in detail herein in reference to successive figures. Circle A-A highlights a feature A-A of disk clamp 228, according to embodiments, which provides a disk clamp 228 structure that may be stiffer in the axial direction 242 than in the radial direction 240.

Figure 3:
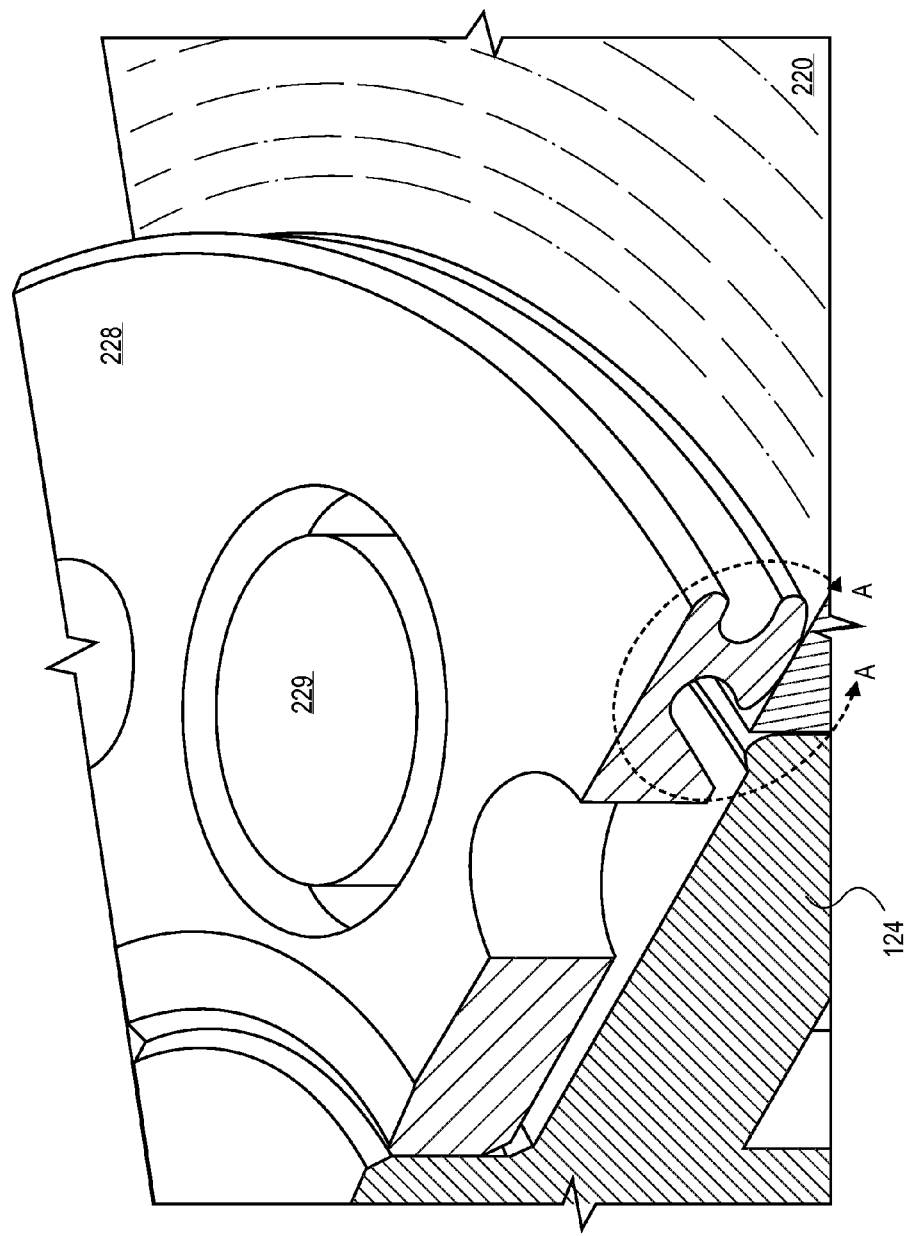
FIG. 3 is a cut-away perspective view illustrating an HDD having a disk clamp, according to an embodiment of the invention.

FIG. 3 is a cut-away perspective view illustrating an HDD having a disk clamp, according to an embodiment of the invention. Depicted in FIG. 3 is spindle 124, to which a recording disk 220 is mechanically coupled by way of disk clamp 228. Disk clamp 228 is shown attached to the spindle 124 using at least one attachment device 229. FIG. 3 illustrates the cross-section of the respective components, namely disk clamp 228. Feature A-A is again highlighted by circle A-A, and is shown in cross-section and described in more detail in reference to FIG. 4.

Note that disk clamp 228 is circular in form, and that the outer portion of disk clamp 228 is in contact with the disk 220 at the inner diameter of disk 220, and that the disk 220 generally circumscribes the disk clamp 228. Thus, according to an embodiment, feature A-A of disk clamp 228 is in contact with the disk 220 around the entire circumference of disk clamp 228. However, one could design a disk clamp having one or multiple intermittent breaks in the continuity or contiguousness of the feature A-A, and thus the contact between the disk 220 and disk clamp 228, and still fall within the scope of the present embodiments. It is this contact between conventional disks and disk clamps, and the clamping force transferred and stress exerted therebetween, that is often the cause of the noted disk distortion and consequent RRO.

Figure 4:
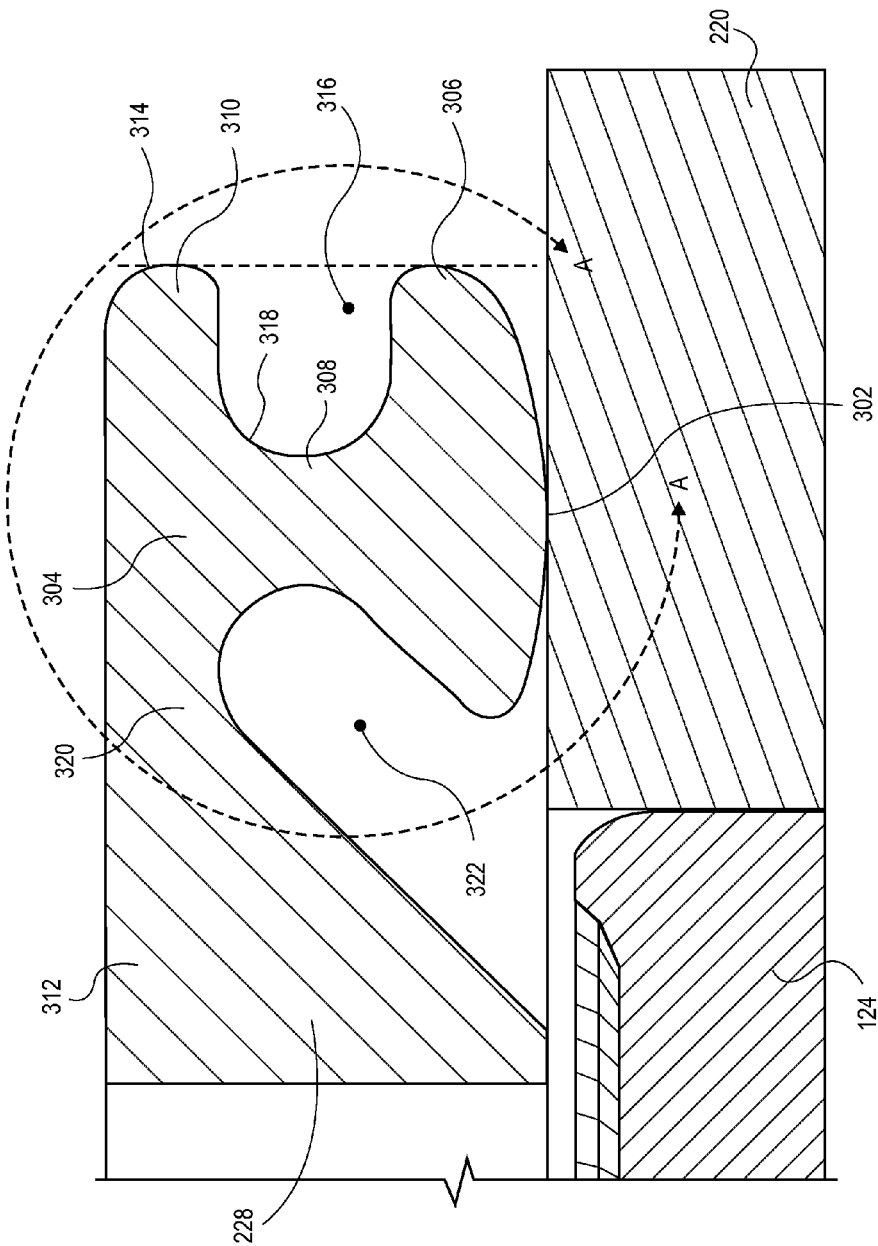
FIG. 4 is a cross-sectional view illustrating the disk clamp of FIG. 3, according to an embodiment of the invention.

FIG. 4 is a cross-sectional view illustrating the disk clamp of FIG. 3, according to an embodiment of the invention. FIG. 4 depicts in detail the feature A-A of disk clamp 228, in contact with disk 220 at a contact area 302, which is affixed to spindle 124 by the clamping force of disk clamp 228. Recall that disk clamp 228 is of a form or structure in which the radial stiffness may be less than the axial stiffness, i.e., the stiffness of disk clamp 228 in the radial direction 240 (FIG. 2) is less than the stiffness of disk clamp 228 in the axial direction 242 (FIG. 2). According to an embodiment, the aforementioned stiffness relation is implemented by a substantially I-shaped cross-sectional structure 304 ("I-shape" or "I-shaped") along the outer portion of the disk clamp 228 generally located at the disk contact area 302. I-shaped structure 304 corresponds to the disk clamp feature previously referred to herein as feature A-A (FIGS. 2-4).

With reference to FIG. 4 and focusing on the details of I-shaped structure 304 according to an embodiment, using I-beam terminology, I-shaped structure 304 has a first flange portion 306 in contact with the disk contact area 302, a substantially vertical web portion 308 positioned axially (i.e., substantially in the axial direction 242 of FIG. 2) in proximate relation with the disk contact area 302, and a second flange portion 310 which extends radially (i.e., in the radial direction 240 of FIG. 2) from an inner portion 312 of disk clamp 228. Similarly, the second flange portion 310 can be described as extending radially from an outer perimeter 314 of disk clamp 228. Therefore, I-shaped structure 304 is configured such that the clamping load applied from disk clamp 228 to disk 220 is applied or exerted through the web portion 308. According to an embodiment, the first flange portion 306 is rounded for localized contact with disk contact area 302, and extends or lies generally in the radial direction.

Continuing with reference to FIG. 4, regarding the form and formation of I-shaped structure 304, according to an embodiment the outer perimeter 314 or outer edge of disk clamp 228 is formed of a vertical wall that has a cut-out 316 radially inward with a rounded terminal surface, or terminus 318. This cut-out 316 forms the outer portion of the I-shaped structure 304. Further, and according to an embodiment, an inner portion 320 of disk clamp 228 is formed of an angled cut-out 322 in an axially upward and radially outward direction.

A disk clamp design such as disk clamp 228 having I-shaped structure 304 introduces flex into the disk clamp 228 in the radial direction 240 (FIG. 2). Thus, for example, as the disk 220 expands radially at a different rate than the disk clamp 228 as the temperature increases, less distortion is introduced to the disk 220 because the disk clamp 228 can flex radially and therefore exerts less peak stress, and more widely distributed stress, to the disk 220. With less disk distortion there is less repeatable runout (RRO) and, consequently, more stable and precise track following, with little to no detrimental effect to the HDD performance due to servo system operations. Further, there remains sufficient clamping forces in the axial direction between the disk clamp 228 and the disk 220 to stably affix the disk 220 to the spindle 124.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive comprising:
    a magnetic-recording disk rotatably mounted on a spindle; and
    a disk clamp coupled with said spindle and in contact with a contact area of said disk, said disk clamp comprising a substantially I-shape cross-section along an outer portion and at said contact area of said disk, said I-shape having a substantially planar top surface of a top flange portion.

2. The hard disk drive of claim 1, wherein said I-shape provides a structure in which the radial stiffness is less than the axial stiffness.

3. The hard disk drive of claim 1, wherein said I-shape provides a structure that is flexible in the radial direction.

4. The hard disk drive of claim 1, wherein said I-shape of said disk clamp comprises a first flange portion in contact with said contact area of said disk, a substantially vertical web portion positioned axially in relation to said contact area of said disk, and a second flange portion which extends radially from an inner portion of said disk clamp, said second flange portion including said top flange portion having said substantially planar top surface in-plane with said inner portion of said disk clamp.

5. The hard disk drive of claim 4, wherein an outer edge of said disk clamp is formed of a vertical wall having a cut-out radially inward and with a rounded terminus, forming an outer portion of said I-shape.

6. The hard disk drive of claim 4, wherein an outer edge of said disk clamp is formed of a vertical wall having a cut-out radially inward and with a rounded terminus, forming an outer portion of said I-shape, and wherein an inner portion of said I-shape is formed of an angled cut-out in an axially upward and radially outward direction.

7. The hard disk drive of claim 4, wherein said first flange portion comprises a rounded surface in contact with said contact area of said disk, and wherein load is applied from said disk clamp to said disk through said web portion.

8. The hard disk drive of claim 1, wherein said disk clamp is circular-shaped and said I-shape within said disk clamp is positioned at the outer perimeter of said circular disk clamp.

9. The hard disk drive of claim 1, wherein said I-shape of said disk clamp comprises a rounded first flange portion in contact with said contact area of said disk.

10. A hard disk drive disk clamp comprising:
a substantially I-shaped cross-sectional structure along an outer portion of said disk clamp and at an area configured for contact with a recording disk, said I-shaped structure having a substantially planar top surface of a top flange portion.

11. The hard disk drive disk clamp of claim 10, wherein said I-shaped structure provides flexibility in the radial direction.

12. The hard disk drive disk clamp of claim 10, wherein said disk clamp comprises a substantially planar top surface, and wherein said I-shaped structure comprises a rounded first flange portion extending in said radial direction and configured for contact with a recording disk, a substantially vertical web portion extending in said axial direction, and a second flange portion extending in said radial direction from an outer perimeter of said disk clamp, said second flange portion including said top flange portion having said substantially planar top surface in-plane with said top surface of said disk clamp.

13. The hard disk drive disk clamp of claim 12, wherein said first flange portion comprises a rounded surface configured for contact with a recording disk, and wherein load applied from said disk clamp to said recording disk is through said web portion.

14. The hard disk drive disk clamp of claim 10, wherein an outer edge of said disk clamp is formed of a vertical wall having a cut-out radially inward and with a rounded terminus, forming an outer portion of said I-shaped structure.

15. The hard disk drive disk clamp of claim 10, wherein an outer edge of said disk clamp is formed of a vertical wall having a cut-out radially inward and with a rounded terminus, forming an outer portion of said I-shaped structure, and wherein an inner portion of said I-shaped structure is formed of an angled cut-out in an axially upward and radially outward direction.

16. A hard disk drive comprising:
means for clamping a recording disk onto a spindle, said means having a structural shape that is more flexible in the radial direction than the axial direction.

17. The hard disk drive of claim 16, wherein said means comprises a substantially I-shape cross-section portion along an outer portion and at a contact area with said disk, said I-shape portion having a planar top surface of a top flange portion.

18. The hard disk drive of claim 17, wherein said I-shape portion comprises a first flange extending in said radial direction and configured for contact with said recording disk, a substantially vertical web extending in said axial direction, and a second flange extending in said radial direction from an inner structure, said second flange portion including said top flange portion having said planar top surface in-plane with said inner structure of said disk clamp.

19. The hard disk drive of claim 18, wherein said first flange comprises a rounded surface in contact with said contact area of said disk, and wherein a clamping load is applied from said means to said disk through said web.

20. The hard disk drive of claim 17, wherein said means comprises an outer edge formed of a vertical wall having a cut-out radially inward and with a rounded terminus, forming an outer portion of said I-shape, and wherein an inner portion of said I-shape is formed of an angled cut-out in an axially upward and radially outward direction.

* * * * *